(12) United States Patent
Sussland et al.

(10) Patent No.: US 8,196,182 B2
(45) Date of Patent: Jun. 5, 2012

(54) DISTRIBUTED MANAGEMENT OF CRYPTO MODULE WHITE LISTS

(75) Inventors: Robert J. Sussland, San Francisco, CA (US); Joshua Oran Silberman, Sunnyvale, CA (US); Ananthan Subramanian, Menlo Park, CA (US); Lawrence Wen-Hao Chang, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 760 days.

(21) Appl. No.: 12/195,507

(22) Filed: Aug. 21, 2008

(65) Prior Publication Data

US 2009/0055646 A1   Feb. 26, 2009

Related U.S. Application Data

(60) Provisional application No. 60/957,883, filed on Aug. 24, 2007.

(51) Int. Cl.
*G06F 7/04* (2006.01)
*G06F 15/16* (2006.01)
*G06F 17/30* (2006.01)
*H04L 29/06* (2006.01)

(52) U.S. Cl. ............ 726/3; 380/44; 380/283; 380/286; 713/155; 713/157; 713/161; 713/168; 726/4; 726/18; 726/21; 726/27; 455/518; 709/223; 709/224

(58) Field of Classification Search .............. 713/168, 713/155, 157, 161; 709/223, 224; 726/3, 726/4, 18, 21, 27; 380/44, 283, 286; 455/518
See application file for complete search history.

(56) References Cited

U.S. PATENT DOCUMENTS 1,310,719 A   7/1919   Vernam
(Continued)

FOREIGN PATENT DOCUMENTS

WO   WO 02/093314 A2   11/2002
(Continued)

OTHER PUBLICATIONS

Anderson, et al., "The Steganographic File System," Information Hiding, Second International Workshop, IH '98 Portland, Oregon. USA, Apr. 14-17, 1998, Proceedings, pp. 73-82, 1998.
(Continued)

*Primary Examiner* — Eleni Shiferaw
(74) *Attorney, Agent, or Firm* — Cesari and McKenna, LLP

(57) ABSTRACT

An apparatus and method for managing the distribution and expansion of public keys held by a group or array of systems in white lists. The addition of a new system to the array entails a manual input to authorize the introduction of the new system to one trusted system in the array. After the introduction the new system is trusted by the one member and the white list of the one member is loaded into the white list of the new system. The new system then requests joining each of the other systems in the array. For each system in the array asked by the new system, the systems in the array ask if any other systems in the array already trust the new member. In response, a system of the array that trusts the new system responds by sending its white list (containing the public key of the new system) to the requesting system. Eventually the public key of the new system is in the white lists of all the systems in the array. In practice this trusts expansion occurs in the background with respect to running applications.

18 Claims, 5 Drawing Sheets

U.S. PATENT DOCUMENTS

| | | | |
|---|---|---|---|
| 4,262,329 | A | 4/1981 | Bright et al. |
| 4,558,176 | A | 12/1985 | Arnold et al. |
| 4,588,991 | A | 5/1986 | Atalla |
| 4,757,533 | A | 7/1988 | Allen et al. |
| 5,065,429 | A | 11/1991 | Lang |
| 5,150,407 | A | 9/1992 | Chan |
| 5,185,717 | A | 2/1993 | Mori |
| 5,235,641 | A | 8/1993 | Nozawa |
| 5,235,642 | A | 8/1993 | Wobber et al. |
| 5,265,159 | A | 11/1993 | Kung |
| 5,265,164 | A | 11/1993 | Matyas et al. |
| 5,677,952 | A | 10/1997 | Blakeley, III et al. |
| 5,687,237 | A | 11/1997 | Naclerio |
| 5,720,034 | A | 2/1998 | Case |
| 5,850,448 | A | 12/1998 | Ganesan |
| 5,870,468 | A | 2/1999 | Harrison |
| 5,931,947 | A | 8/1999 | Burns |
| 5,933,498 | A | 8/1999 | Schneck et al. |
| 5,940,507 | A | 8/1999 | Cane |
| 5,991,406 | A | 11/1999 | Lipner et al. |
| 6,073,237 | A | 6/2000 | Ellison |
| 6,119,098 | A | 9/2000 | Guyot et al. |
| 6,134,660 | A | 10/2000 | Boneh et al. |
| 6,175,924 | B1 | 1/2001 | Arnold |
| 6,185,681 | B1 | 2/2001 | Zizzi |
| 6,185,684 | B1 | 2/2001 | Pravetz et al. |
| 6,212,280 | B1 | 4/2001 | Howard et al. |
| 6,212,600 | B1 | 4/2001 | Friedman et al. |
| 6,249,866 | B1 | 6/2001 | Brundrett |
| 6,272,632 | B1 | 8/2001 | Carman et al. |
| 6,345,101 | B1 | 2/2002 | Shukla |
| 6,356,941 | B1 | 3/2002 | Cohen |
| 6,405,315 | B1 | 6/2002 | Burns et al. |
| 6,414,884 | B1 | 7/2002 | DeFelice et al. |
| 6,507,911 | B1 | 1/2003 | Langford |
| 6,550,011 | B1 | 4/2003 | Sims, III |
| 6,625,734 | B1 | 9/2003 | Marvit et al. |
| 6,684,222 | B1 | 1/2004 | Cornelius et al. |
| 6,735,693 | B1 | 5/2004 | Hamlin |
| 6,754,827 | B1 | 6/2004 | Cane et al. |
| 6,792,544 | B2 | 9/2004 | Hashem |
| 6,839,437 | B1 | 1/2005 | Crane et al. |
| 6,851,056 | B2 | 2/2005 | Evans |
| 6,857,076 | B1 | 2/2005 | Klein |
| 6,868,406 | B1 | 3/2005 | Ogg et al. |
| 6,915,435 | B1 | 7/2005 | Merriam |
| 6,931,133 | B2 | 8/2005 | Andrews et al. |
| 6,993,661 | B1 | 1/2006 | Garfinkel |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,120,696 | B1 | 10/2006 | Au et al. |
| 7,120,797 | B2 * | 10/2006 | Wheeler ............ 713/176 |
| 7,136,995 | B1 | 11/2006 | Wann |
| 7,139,917 | B2 | 11/2006 | Jablon |
| 7,146,505 | B1 | 12/2006 | Harada et al. |
| 7,188,253 | B2 | 3/2007 | Halasz et al. |
| 7,215,771 | B1 | 5/2007 | Hamlin |
| 7,222,228 | B1 | 5/2007 | Stephens et al. |
| 7,240,197 | B1 | 7/2007 | Yamagami et al. |
| 7,260,724 | B1 | 8/2007 | Dickinson et al. |
| 7,340,500 | B2 * | 3/2008 | Traversat et al. ............ 709/201 |
| 7,346,160 | B2 | 3/2008 | Michaelsen |
| 7,383,436 | B2 | 6/2008 | Srivastava et al. |
| 2001/0054155 | A1 | 12/2001 | Hagan et al. |
| 2002/0046286 | A1 | 4/2002 | Caldwell et al. |
| 2002/0073324 | A1 | 6/2002 | Hsu |
| 2002/0110244 | A1 | 8/2002 | Flanagan et al. |
| 2002/0114453 | A1 | 8/2002 | Bartholet et al. |
| 2003/0021417 | A1 | 1/2003 | Vasic et al. |
| 2003/0028765 | A1 | 2/2003 | Cromer et al. |
| 2003/0088866 | A1 | 5/2003 | Boldon et al. |
| 2004/0030668 | A1 | 2/2004 | Pawlowski et al. |
| 2004/0107342 | A1 | 6/2004 | Pham et al. |
| 2005/0018853 | A1 | 1/2005 | Lain et al. |
| 2005/0044356 | A1 * | 2/2005 | Srivastava et al. ............ 713/163 |
| 2006/0031510 | A1 * | 2/2006 | Beck et al. ............ 709/226 |
| 2006/0136735 | A1 * | 6/2006 | Plotkin et al. ............ 713/182 |
| 2007/0058801 | A1 | 3/2007 | Plotkin |
| 2007/0174634 | A1 | 7/2007 | Plotkin |
| 2008/0101610 | A1 | 5/2008 | Birk et al. |
| 2008/0184350 | A1 * | 7/2008 | Chu ............ 726/7 |
| 2008/0301791 | A1 | 12/2008 | Smith et al. |
| 2009/0089450 | A1 | 4/2009 | Weatherford et al. |
| 2009/0089867 | A1 | 4/2009 | Weatherford et al. |

FOREIGN PATENT DOCUMENTS

| | | |
|---|---|---|
| WO | WO 02/093314 A3 | 11/2002 |

OTHER PUBLICATIONS

Antonelli, et al., "The Packet Vault: Secure Storage of Network Data," CITI Technical Report 98-5, pp. 1-15, Jun. 25, 1998.

Baldwin, et al., "Encryption and Key Management in a SAN," Hewlett Packard Laboratories, Bristol, UK, 10 pages, 2002.

Blaze, "Oblivious Key Escrow," Information Hiding, First International Workshop, Cambridge, UK, May 3-Jun. 1, 1996, Proceedings, pp. 335-343, 1996.

Blaze, "A cryptographic File System for Unix," Proceedings of the First ACM Conference on Computer and Communications Security, pp. 9-16 (1993).

Blaze, "Key Management in an Encrypting File System," USENIX Summer 1994 Technical Conference, pp. 27-35, (Jun. 6-10, 1994).

Bojinov, et al., Apparatus for Lifetime Key Management, U.S. Appl. No. 11/740,474, filed Apr. 26, 2007, 26 pages.

Bojinov, et al., Encryption Keys for Data Recovery in Storage Security Appliances, U.S. Appl. No. 11/532,025, filed Sep. 14, 2006, 16 pages.

Boneh, et al., "A Revocable Backup System," In Proceedings 6th USENIX Security Conference, pp. 91-96, 1996.

Cattaneo, et al. "The Design and Implementation of a Transparent Cryptographic Filesystem for UNIX," Proceedings of the FREENIX Track: 2001 UNIX Annual Technical Conference. pp. 199-212 (Jun. 25-30, 2001).

Christy, et al., "Mechanism for Secure Off-Site Computer Access," IBM Technical Disclosure Bulletin. pp. 6754-6756. Apr. 1985.

Clark, "Physical Protection of Cryptographic Devices," Lecture Notes in Computer Science. Advances in Cryptology—EUROCRYPT '87, pp. 83-93 (Apr. 13-15, 1987).

Coleman et al., "Mass Storage System Reference Manual: Version 4," Technical Committee on Mass Storage Systems and Technology, IEEE, pp. 1-38, May 1990.

Comba, "Approaches to Cryptographic Key Management," Symposium on Applied Computing. Proceedings of the Northeast ACM Symposium on Personal Computer Security, pp. 38-45 (1986).

Denning, "Cryptography and Data Security," Addison-Wesley Publishing Co., pp. 164-169 and 179, 1982.

Di Crescenzo, et al., "How to Forget a Secret (Extended Abstract)," 16th Annual Symposium on Theoretical Aspects of Computer Science, pp. 500-509 (Mar. 4-6, 1999).

Dietrich, "Security Enclosure With Elastomeric Contact Stripes," IBM Technical Disclosure Bulletin, pp. 444-445, Feb. 1991.

"Disappearing Inc. Makes Old Email Vanish Everywhere; Reduces Corporate Liability as well as Improves Corporate Productivity by Enabling Sensitive Communications via Email-Company Business and Marketing," Edge: Work-Group Computing Report, http://findarticles.com/p/articJes/mLmOWUB/is_1999_OcU 1/aL 56260487/print (Oct. 11, 1999).

Double, "Encryption Key Security by Electric Field Destruction of Memory Cells," IBM Technical Disclosure Bulletin, pp. 8-11, Jan. 1989.

FIPS PUB 74, "Federal Information Processing Standards Publication 1981 Guidelines for Implementing and Using the NBS Data Encryption Standard," Federal Information Processing Standards Publication 74, National Institute of Standards and Technology, Apr. 1, 1981, 39 pages.

FIPS PUB 140-1, "Security Requirements for Cryptographic Modules," Federal Information Processing Standards Publication 140-1, National Institute of Standards and Technology, Jan. 11, 1994, 44 pages.

Flavin, et al., "Data Protection on Magnetic Media Via an Encrypting Controller," IBM Technical Disclosure Bulletin, vol. 3D, No. 3, pp. 1284-1285 (Aug. 1987).
Gandhasri, R., Host Based Rekeying, U.S. Appl. No. 11/772,447, filed Sep. 4, 2007, 25 pages.
Garfinkel, S., "PGP: Pretty Good Privacy," O'Reilly & Associates, pp. 43 and 65-67, Jan. 1995.
Garfinkel, S., "PGP: Pretty Good Privacy," O'Reilly & Associates, pp. 54-55, 151-153, Jan. 1995.
Garfinkel, S., "Omniva's Self-Destructing Email," Web Security, Privacy and Commerce, Second Edition, O'Reilly & Associates, Inc., Sebastopol, CA, pp. 280-283, Jan. 2002.
Gobioff, Howard, et al., "Security for Networked Attached Storage Devices," Carnegie Mellon University Computer Science Technical Report CMU-CS-97-185, Oct. 1997, 20 pages.
Gobioff, Howard, "Security for a High Performance Commodity Storage Subsystem," Carnegie Mellon University Computer Science Technical Report CMU-CS-99-160, Jul. 1999, 222 pages.
Gobioff, Howard, et al., "Smart Cards in Hostile Environments," Proceedings of the Second USENIX Workshop on Electronic Commerce, pp. 23-28 (Nov. 18-21, 1996).
Graham, et al, "Data Protection at the Volume Level," IBM Technical Disclosure Bulletin, pp. 146-148, Oct. 1988.
Gutmann, "Secure Deletion of Data from Magnetic and Solid-State Memory," Proceedings of the Sixth Annual USENIX Security Symposium: Focusing on Applications of Cryptography, pp. 7-89 (Jul. 22-25, 1996).
Hwang, et al., "An Access Control Scheme Based on Chinese Remainder Theorem and Time Stamp Concept," Computers & Security, vol. 15. No. 1. pp. 73-81,1996.
IBM Crypto Server Management General Information Manual, First Edition (May 2000), 16 pages.
IBM SecureWay Cryptographic Products IBM 4758 PCI Cryptographic Coprocessor Installation Manual, Security Solutions and Technology Department, Second Edition (Mar. 2000), 34 pages.
IBM Integrated Cryptographic Coprocessors for IBM eServer zSeries 900 and for IBM S/390 Servers (Data sheet), 2000, 4 pages.
IBM SecureWay, UltraCypher Cryptographic Engine (Datasheet) (1998), 2 pages.
IBM 4758 PCI Cryptographic Coprocessor Custom Software Installation Manual, Second Edition, Jan. 2001, 30 pages.
Avoid Litigation: Encrypt Your Data, InfoTech Research Group, Sep. 19, 2006, 6 pages.
Ishii, H., et al., Cluster Key Synchronization, U.S. Appl. No. 11/741,495, filed Apr. 27, 2007, 33 pages.
Ishii, H., et al., Peer to Peer Key Synchronization, U.S. Appl. No. 11/740,490, filed Apr. 26, 2007, 31 pages.
Itoi, "SC-CFS: Smartcard Secured Cryptographic File System," CITI Technical Report 01-6, Center for Information Technology Integration, University of Michigan, Jan. 16, 2001, 11 pages.
Johnson et al., "Self-Destructing Diskette," IBM Technical Disclosure Bulletin, vol. 33, No. 1A, pp. 218-219 (Jun. 1990).
Mallett, "Considerations for Applying Disk Encryptors 10 Environments Subject to Hostile Overrun," IEEE, pp. 218-222, 1991.
Mauriello, "TCFS: Transparent Cryptographic File system," LINUX Journal, Aug. 1, 1997, 8 pages.
Menezes et al., "Handbook of Applied Cryptography," CRC Press, pp. 1-794, 1997.
Moore, "Preventing Access to a Personal Computer," IBM Technical Disclosure Bulletin, pp. 98-100, Sep. 1992.
Omniva Policy Systems, www.omniva.com, (Aug. 2004), downloaded from web.archive.org on Aug. 24, 2004, 19 pages.
Provos, Niels, "Encrypting Virtual Memory," CITI Technical Report 00-3, Center for Information Technology Integration, University of Michigan, Apr. 25, 2000, 11 pages.
Scherzer. "Memory Protection in Chip Cards," IBM Technical Disclosure Bulletin, pp. 416-417, Oct. 1989.
Schneier, "Applied Cryptography Second Edition: Protocols, Algorithms, and Source Code in C," John Wiley & Sons, Inc. pp. 5, 15, 179-181, 185, 213-214, 225, 229, 563-566 and 569. 1996.
Slusarczuk et al., "Emergency Destruction of Information Storage Media," Institute for Defense Analysis, IDA Report R-321, Dec. 1987, 196 pages.
Smith, "Verifying Type and Configuration of an IBM 4758 Device: A While Paper," IBM T.J. Watson Research Center pp. 1-7 (218/00).
Smith et al., "IBM Research Report: Building a High-Performance, Programmable Secure Coprocessor," IBM Research Division, Computer Science/Mathematics, RC 21102(94393) (Feb. 19, 1998), 61 pages.
Stinson, Douglas R., "Cryptography: Theory and Practice," CRC Press, Mar. 1, 1995, 228 pages.
Subramanian, A., et al., System and Method for Initial Key Establishment Using a Split Knowledge Protocol, U.S. Appl. No. 11/540,440, filed Sep. 29, 2007, 27 pages.
Vernam, "Cipher Printing Telegraph Systems for Secret Wire and Radio Telegraphic Communications," Journal of the AIEE. pp. 109-115, Feb. 1926.
Weingart, "Physical Security for the uABYSS System," Proceedings 1987 IEEE Symposium on Security and Privacy, pp. 2-58 (Apr. 27-29, 1987), pp. 52-58.
Whitten et al., "Usability of Security: A Case Study," CMU Computer Science Technical Report CMU-CS-98-155. pp. 1-39, Dec. 18, 1998.
Yee et al., "Secure Coprocessors in Electronic Commerce Applications," Proceedings of the First USENIX Workshop of Electronic Commerce, pp. 155-170, Jul. 11-12, 1995.
Yeh et al., "S/390 CMOS Cryptographic Coprocessor Architecture: Overview and Design Considerations," IBM J. Res. Develop., vol. 43, No. 5/6, pp. 777-794 (Sep./Nov. 1999).
Zadok et al., "Cryptfs: A Stackable Vnode Level Encryption File System," Computer Science Department, Columbia University, CUCS-021-98, pp. 1-14, Jun. 1998.
U.S. Appl. No. 60/957,883, filed Aug. 24, 2007, entitled Distributed Management of Crypto Module White Lists, by Sussland, et al., 29 pages.

* cited by examiner

DISTRIBUTED MANAGEMENT OF CRYPTO MODULE WHITE LISTS

RELATED APPLICATION

This application claims priority to U.S. Provisional Patent Application Ser. No. 60/957,883, entitled, DISTRIBUTED MANAGEMENT OF CRYPTO MODULE WHITE LISTS by Robert Sussland, et al, which was filed on Aug. 24, 2007, a copy of which is incorporated herein by reference.

BACKGROUND OF THE INVENTION

1. Field of the Invention

The present invention relates to security appliances and, more specifically, to a technique for securely establishing trusted relationships among an arrary of nodes in a security appliance.

2. Background of the Invention

As alluded to above, the present invention may apply to virtually any group of array of nodes communicating among each other. Smart herein refers to having computer processing abilities. The background and embodiments of the present invention are described with respect to secure storage systems, but any array of systems where trusted relationships among the systems is required may benefit from the present invention.

A storage system is a computer that provides storage services relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as files on, e.g., the disks. Each "on-disk" file may be implemented as a set of data structures, e.g., disk blocks, configured to store information, such as the actual data (i.e., file data) for the file.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS) and the Network File System (NFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored data using block-based access protocols over the "extended bus." In this context, the extended bus is typically embodied as Fibre Channel (FC) or Ethernet media adapted to operate with block access protocols, such as Small Computer Systems Interface (SCSI) protocol encapsulation over FC (e.g., FCP) or TCP (iSCSI).

SCSI is a peripheral input/output (I/O) interface with a standard, device independent protocol that allows different peripheral devices, such as disks, to attach to a storage system. In SCSI terminology, clients operating in a SAN environment are "initiators" that initiate commands and requests to access data. The storage system is thus a "target" configured to respond to the data access requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

A SAN arrangement or deployment allows decoupling of storage from the storage system, such as an application server, and some level of information storage sharing at the storage system level. There are, however, environments wherein a SAN is dedicated to a single storage system. In some SAN deployments, the information is organized in the form of databases, while in others a file-based organization is employed. Where the information is organized as files, the client requesting the information maintains file mappings and manages file semantics, while its requests (and storage system responses) address the information in terms of block addressing on disk using, e.g., a logical unit number (lun).

A network environment may be provided wherein information (data) is stored in secure storage served by one or more storage systems coupled to one or more security appliances. Each security appliance is configured to transform unencrypted data (cleartext) generated by clients into encrypted data (ciphertext) destined for secure storage or "cryptainers" on the storage system. As used herein, a cryptainer is a piece of storage on a storage device, such as a disk, in which the encrypted data is stored. In the context of a SAN environment, a cryptainer can be, e.g., a disk, a region on the disk or several regions on one or more disks that, in the context of a SAN protocol, is accessible as a lun. In the context of a NAS environment, the cryptainer may be a collection of files on one or more disks. Specifically, in the context of the CIFS protocol, the cryptainer may be a share, while in the context of the NFS protocol, the cryptainer may be a mount point. In a tape environment, the cryptainer may be a tape containing a plurality of tape blocks.

Each cryptainer is associated with its own encryption key, e.g., a cryptainer key, which is used by the security appliance to encrypt and decrypt the data stored on the cryptainer. An encryption key is a code or number which, when taken together with an encryption algorithm, defines a unique transformation used to encrypt or decrypt data. Data remains encrypted while stored in a cryptainer until requested by an authorized client. At that time, the security appliance retrieves the encrypted data from the cryptainer, decrypts it and forwards the unencrypted data to the client.

Often the security appliance is configured with a group or array of nodes, e.g., storage encryption processors (SEPs), each of which is configured to perform encryption and decryption operations for the appliance.

In such a configuration security is paramount. In this instance each node may process, inter alia, secure communications among the array of nodes. Nodes, such as SEPs, are discussed as sources and receivers of the secure communications discussed below, but as known to those skilled in the art, other software modules may participate in the detailed communication.

The invention addresses the problem of user enrollment in a distributed context. To understand the complexities involved, a review of the current state of the art is appropriate. The historically older and simpler approach is for each node to maintain its own list of user attributes. Such a list is often called a "white list", as it explicitly states the entities that are allowed access. An example of such an approach would be a set of computers, each with a list of users allowed to log into each computer. This approach is easiest to implement from the point of view of the programmer, but suffers from several drawbacks. The first is that when a new user enrolls into the system, they must create accounts on every node. Because account creation is a sensitive operation that requires placing the node in a special state (for example, typically only administrators may manually create user accounts), account creation is necessarily a manual operation which exposes the node to a window of additional security risk. Also, to remove a user from access requires account removal at each node. Note that the information in the whitelist can consist of the username, or a public key, or a symmetric key, or other attributes required to correctly identify the entity and securely perform services for that entity. It does not matter whether the entity is a human user requesting services from a set of computers, or whether the user is a peer node requesting services from other nodes. The critical issue is the mechanism by which the entity is enrolled and un-enrolled from the group.

Because of the management complexity of having each node maintain its own white list, a popular solution is to have a master certifying agent that all the nodes trust. In this scenario, the certification agent (in the context of public key infrastructures, this is called a certification authority, and in the context of other infrastructures, different names may be used) admits each entity by granting that entity some token or certificate of membership. Thereafter, the entity presents evidence of possessing the token or certificate to any other node in order to be granted access. This approach has the advantage of replacing multiple enrollment operations (one operation for each node) with a single enrollment operation. However, in order for this approach to be secure, there must be a mechanism to revoke the token or certificate in case the entity should no longer have access. This is a problem, as the token or certificate have already been given to the enrolled entity. To remedy this problem, a "black list", or list of forbidden users is kept by the certification agent. Then, each time an entity wishes to access a service from a node, the node queries the certification agent to see if the requesting entity is on the blacklist, before granting access. In the context of public key infrastructures, this is often called a certificate revocation list, although other terms may be used depending on the infrastructure employed. Therefore, the disadvantage of this approach, which we call the "blacklist" approach, is that the enrollment burden is shifted to every authentication attempt. Because of the computational and communications overhead of processing blacklists, this approach rarely properly implemented.

In preferred embodiments of the present invention it would be advantageous to array nodes with varying capabilities, some more flexible and some more restricted.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

SUMMARY OF THE INVENTION

The above limitations are addressed in a system and method for managing the distribution of white lists, sometimes referred to as crypto white lists, among an array of nodes. In a security appliance as discussed herein, a white list is a list of the trusted public keys and identification information of other nodes within the array (an array being any type of array or grouping that share some type of communication). Initially, a white list may be populated manually via an administrator or other cryptographic officer. However, the present invention provides for an automatic (no human interaction) expansion of white lists throughout an array of trusted nodes. In an illustrative embodiment, the nodes are embodied as SEPs, however, the present application applies to any grouping of nodes with processing capabilities that share a common trust relationship.

Once trusted by a first established and trusted member node in an array, the public key and any other identification information of a newly trusted node is added to the white list of the first node. That white list (includes entry of the new node and the entries of all the other trusted nodes in the array) is delivered to the newly trusted node, that then requests to become trusted (that is, join and become a member of the array) by a second established node in the array. The second node may inquire, e.g., by broadcasting, of the other nodes in the array if any node already trusts this new node. The first node responds with its white list containing the public key of the new node. The new node continues this process of trust expansion with each member of the array until all the nodes in the array have the public key of the new node in their white lists. This trust expansion process occurs, preferably, in the background (background processing) with no human interaction and little impact on data processing operations of an appliance.

If no node in the array trusts the new node, that new node will not be admitted to the array. Its public key will not be an entry in the white lists. In other words, there must be a separate operation to add a new node to an existing array, but this operation needs to only occur once.

In an illustrative embodiment, information including public keys for and identification of one or more SEPs may be provided by an administrator during an initial configuration of a security appliance. Thereafter the initial set up, the information may be added to the white lists by the trust expansion process described herein.

In another illustrative embodiment, SEPs with less capability may be part of the array. This lesser capability, for example, may restrict an SEP to participate in only limited data processing operations while more capable SEPs may participate in managing the array as well as data processing.

In another illustrative embodiment, there may be periodic flushings or removals of unused entries in the white lists.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
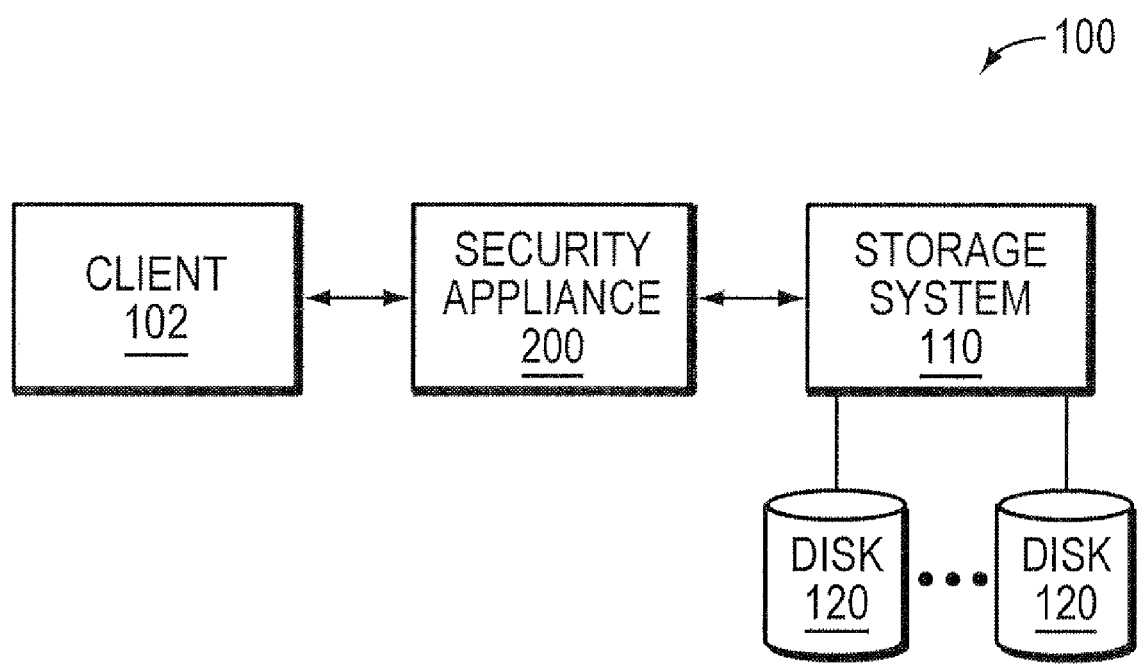
FIG. 1 is a schematic block diagram of an environment including a security appliance.

FIG. 1 is a schematic block diagram of an environment 100 including a multi-protocol security appliance 200 that may be advantageously operated in an illustrative embodiment of the present invention. The security appliance 200 is coupled between one or more clients 102 and one or more storage systems 110, such as an application server or filer. The security appliance 200, which is configured to act as an encryption proxy, intercepts a data access request issued by client 102 and destined for the storage system 110, wherein the data access request may be a read request to retrieve certain data stored on storage devices, such as disks 120, coupled to the storage system 110 or a write request to store data on the disks. In the case of a write request, the security appliance 200 intercepts the request, encrypts the data associated with the request and forwards the encrypted data to the storage system 110 for storage at a specified location (address) on disk 120. In the case of a read request, the security appliance intercepts the request and forwards it onto the storage system, which returns the requested data to the appliance in encrypted form. The security appliance 200 then decrypts the encrypted data and returns the decrypted data to the client 102.

In the illustrative embodiment, the security appliance employs a conventional encryption algorithm, e.g., the Advanced Encryption Standard (AES) or other appropriate algorithms, to transform unencrypted data (cleartext) generated by the clients 102 into encrypted data (ciphertext) intended for secure storage, i.e., one or more cryptainers, on the storage system 110. To that end, the security appliance illustratively uses a high-quality, software or hardware-based pseudo random number generation technique to generate encryption keys. The encryption and decryption operations are performed using these encryptions keys, such as a cryptainer key associated with each cryptainer. In addition to performing encryption and decryption operations, the security appliance 200 also performs access control, authentication, virtualization, and secure-logging operations.

Figure 2:
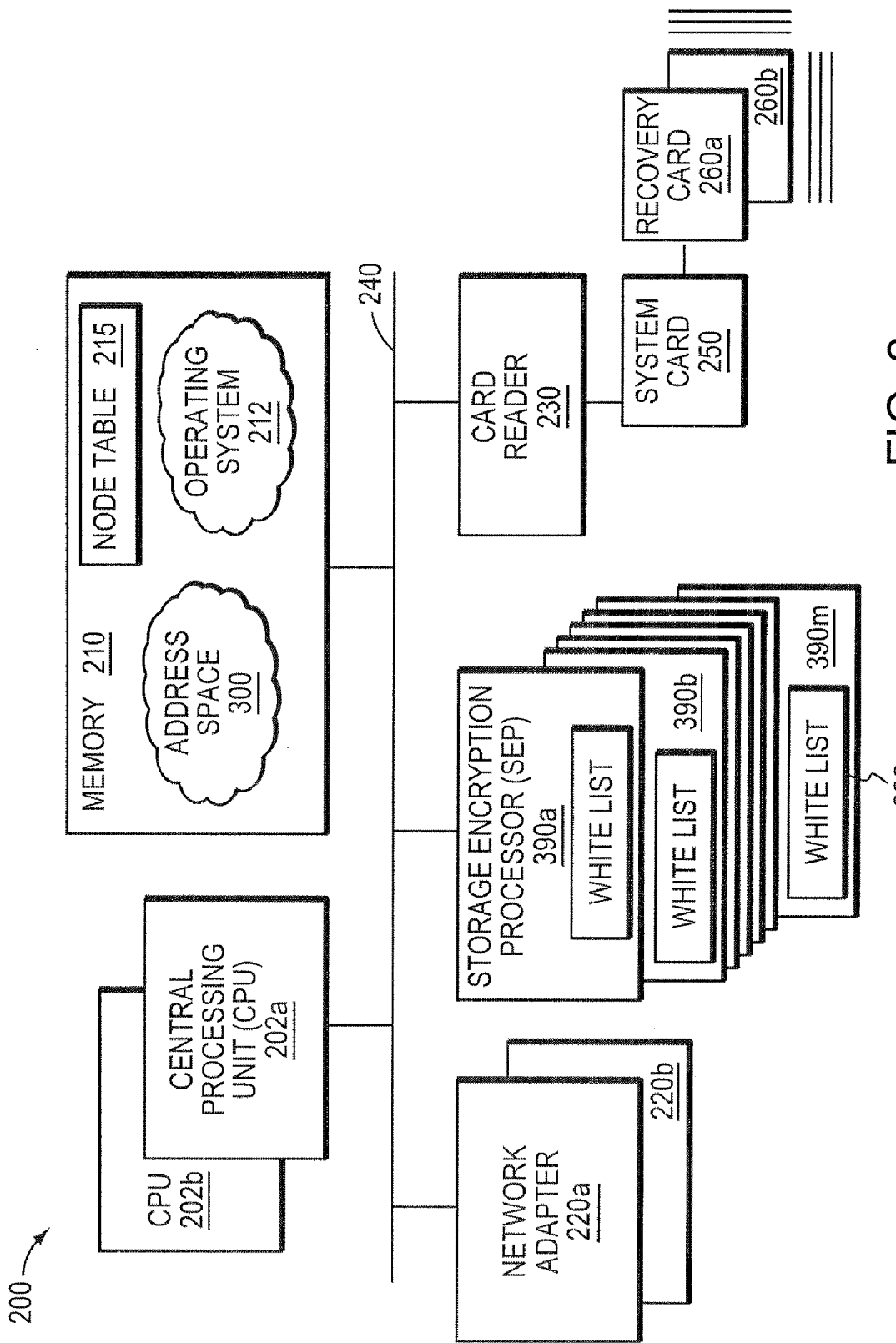
FIG. 2 is a schematic block diagram of a security appliance with a array or group of SEPs sharing a communication fabric among each other.

FIG. 2 is a schematic block diagram of the multi-protocol security appliance 200 that may be advantageously used with the present invention. As used herein, a security appliance denotes a computer having features such as simplicity of security service management for users (system administrators) and clients of network attached storage (NAS) and storage area network (SAN) deployments. The security appliance comprises one or more processors, e.g., central processing units (CPU 202*a,b*), a memory 210, one or more network adapters 220*a,b*, an array of nodes, embodied as storage encryption processors (SEP 390*a*-390*n*)) and a card reader 230 interconnected by a system bus 240, such as a conventional Peripheral Component Interconnect (PCI) bus. The SEP 390's are configured to perform all encryption and decryption operations for the security appliance in a secure manner; for example, the SEPs are configured to protect plaintext encryption keys from system software executing on the CPUs. Accordingly, each SEP may be illustratively embodied as a FIPS 140-2 certified module that is connected to a dedicated interface card or other similar card.

Since a SEP 390 protects encryption keys from being "touched" (processed) by the system software executing on the CPU 202, a mechanism is needed, at least initially to load keys into and retrieve keys from the SEP. To that end, the card reader 230 provides an interface between a "smart" system card 250 and SEP 390 for purposes of exchanging encryption keys. Illustratively, the system card is a FIPS 140-2 certified card that is configured with customized software code. As described further below, a portion of the cryptographic information, needed to initialize the security appliance, is stored on the system card 250, thereby preventing the initialization of the appliance 200 without the presence of the card 250. The security appliance (and card reader 230) are further configured to support additional smart cards referred to as recovery cards 260*a, b, n*.

In an illustrative embodiment, the security appliance includes an array of SEPs, 390*a*-390*n*) that responds to a client request as a secure entity. The array of SEPs facilitates the processing of the client request and is capable of having SEPs added or removed as discussed herein while maintaining security. Each SEP holds a white list 392 that contains the public keys and identification of other trusted SEPS in the array, 390*a*-390*n*. These white lists are usually held in non-volatile memory so that the lists may be updated, as described below, as new SEP's join the array and/or old SEPs are removed.

Operationally, encryption keys are exchanged between the SEPs 390 and system card 250, where they are "secret shared" (cryptographically assigned) to the recovery cards 260 as recovery keys. These recovery keys can thereafter be applied (via the recovery cards) to the security appliance 200 to enable restoration of other encryption keys (such as cryptainer keys). A quorum setting for the recovery cards 260 may be provided such that the recovery keys stored on the recovery cards are backed up in a threshold scheme whereby, e.g., any 2 of the 5 default cards can recover the keys. The use of these recovery cards may be referred to herein as activities performed by recovery officers, since the recovery cards are controlled by humans.

The network adapters 220 couple the security appliance 200 between one or more clients 102 and one or more storage systems 110 over point-to-point links, wide area networks, virtual private networks implemented over a public network (Internet) or shared local area networks. In a SAN environment configured to support various Small Computer Systems Interface (SCSI)-based data access protocols, including SCSI encapsulated over TCP (iSCSI) and SCSI encapsulated over FC (FCP), the network adapters 220 may comprise host bus adapters (HBAs) having the mechanical, electrical and signaling circuitry needed to connect the appliance 200 to, e.g., a FC network. In a NAS environment configured to support, e.g., the conventional Common Internet File System (CIFS) and the Network File System (NFS) data access protocols, the network adapters 220 may comprise network interface cards (NICs) having the mechanical, electrical and signaling circuitry needed to connect the appliance to, e.g., an Ethernet network.

The memory 210 illustratively comprises storage locations that are addressable by the processors and adapters for storing software programs and data structures associated with the present invention. The processor and adapters may, in turn, comprise processing elements and/or logic circuitry configured to execute the software programs and manipulate the data structures. An operating system 212, portions of which are typically resident in memory and executed by the processing elements, functionally organizes the appliance 200 by, inter alia, invoking security operations in support of software processes and/or modules implemented by the appliance. It will be apparent to those skilled in the art that other processing and memory means, including various computer readable media, may be used for storing and executing program instructions pertaining to the invention described herein.

Figure 3:
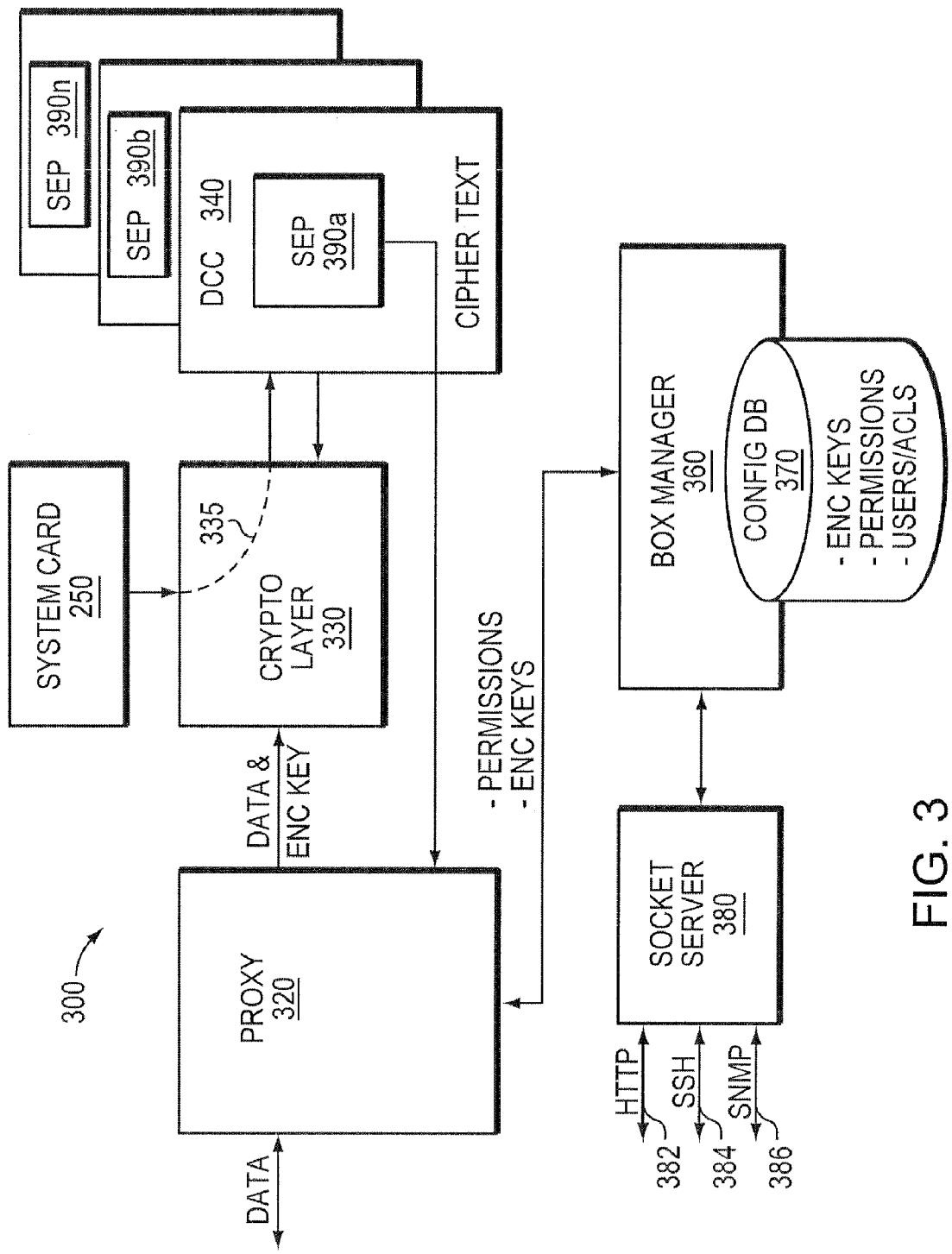
FIG. 3 is a schematic diagram illustrating an arrangement of software processes and modules executing on the security appliance in accordance with the present invention.

The operating system 212 illustratively organizes the memory 210 into an address space arrangement available to the software processes and modules executing on the processors. FIG. 3 is a schematic diagram illustrating an arrangement 300 of software processes and modules executing on the security appliance 200 in accordance with the present invention. In the illustrative embodiment, the operating system software is a customized version of a Unix type operating system, although other operating systems, such as a Microsoft Windows operating system may be used.

For both NAS and SAN environments, data is received at a proxy 320 of the security appliance. The proxy 320 is a kernel module embodied as, e.g., a network protocol stack configured to interpret the protocol over which data is received and to enforce certain access control rules based on one or more policies. Each policy is served by a box manager 360 that is illustratively embodied as a database application process configured to manage a configuration repository or database (Config DB 370) that stores permissions, access control lists (ACLs), system-wide settings and encrypted keys. A socket server 380 provides interfaces to the box manager 360, including (i) an HTTP web interface 382 embodied as, e.g., a graphical user interface (GUI) adapted for web-based administration, (ii) a SSH interface 384 for command line interface (CLI) command administration, and (iii) an SNMP interface 386 for remote management and monitoring.

Specifically, the box manager 360 supplies the permissions and encrypted keys to the proxy 320, which intercepts data access requests and identifies the sources (clients 102) of those requests, as well as the types of requests and the storage targets (cryptainers) of those requests. The proxy also queries the box manager for permissions associated with each client and, in response, the box manager 360 supplies the appropriate permissions and encrypted key (e.g., a cryptainer key). The proxy 320 then bundles the data together with the encrypted key and forwards that information to a crypto process (layer) 330 that functions as a "wrapper" (see below) for the SEPs 390 et seq. The SEPs illustratively reside on interface cards, that are hereinafter referred to as data crypto cards (DCC 340).

The crypto layer 330 interacts with the DCC 340 by accessing (reading and writing) registers on the DCC and, to that end, functions as a PCI interface. Illustratively, a descriptor queue is used by the crypto layer to access the DCC by, e.g., supplying starting and ending points of data, as well as offsets into the data and the encrypted keys used to encrypt the data. The DCC 340 includes one or more previously loaded keys used to decrypt the supplied encrypted keys; upon decrypting an encrypted key, the DCC uses the decrypted key to encrypt the supplied data. Upon completion of encryption of the data, the DCC returns the encrypted data as ciphertext to the proxy 320, which forwards the encrypted data to the storage system 110.

The above discussion describes systems and operations used in an embodiment of the invention that includes a trust expansion and up-dating of "white lists" of public keys held in the arrayed SEPs.

Figure 4:
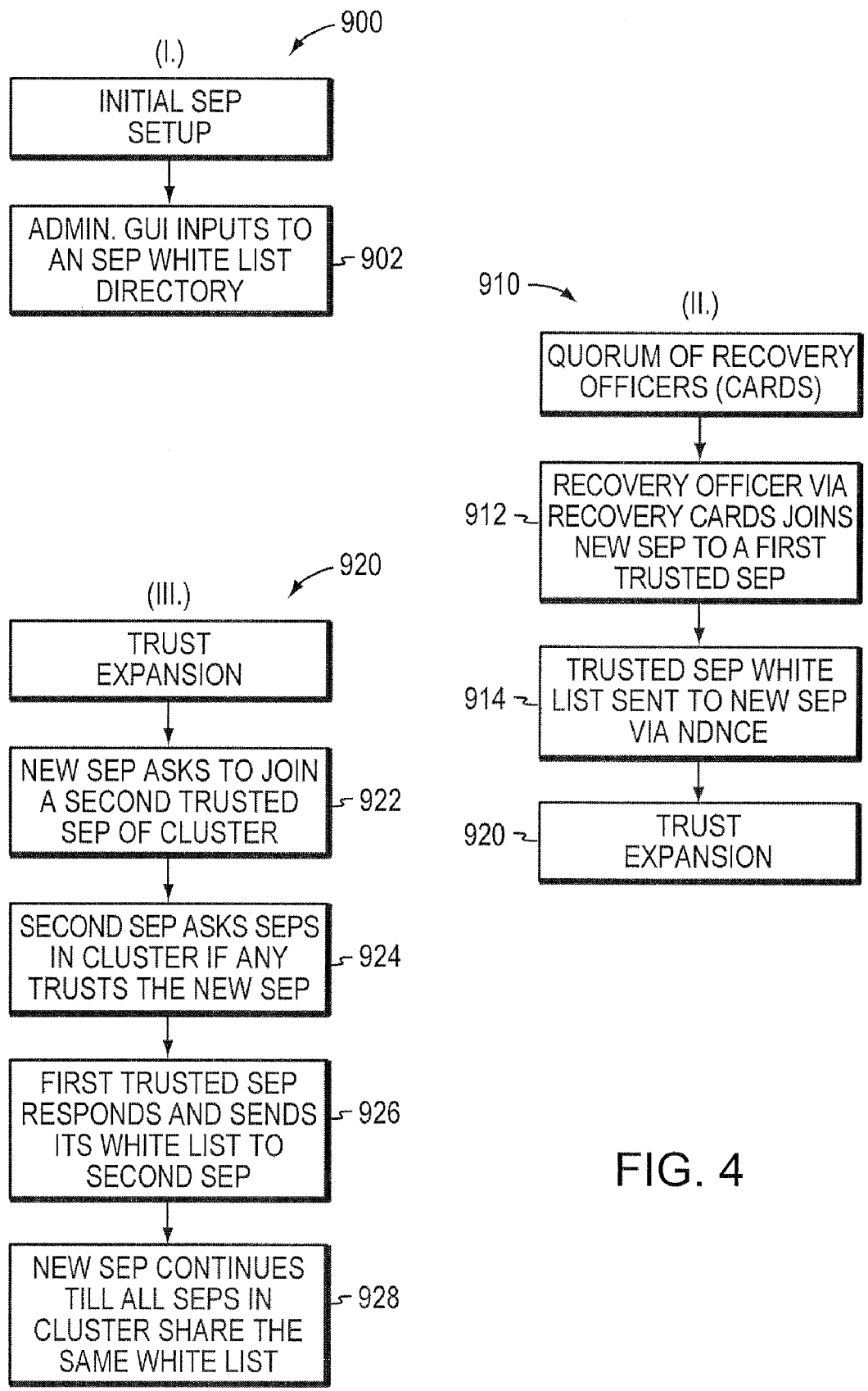
FIG. 4 depicts three flow charts illustrating the populating of white lists.

FIG. 4 illustrates three flow charts of ways to advantageously populate SEP white lists using the present invention. The first flow chart 900 illustrates that during initial setup there is an "open enrollment" phase where any number of public keys may be added to a white list. The second flow chart 910 illustrates that a quorum of recovery officers may authorize a new public key to be added to a particular SEP's white list. Third, 920, a trust expansion where a new SEP once trusted by one SEP member of an array is sequentially trusted by each of the other SEP members of the array. This sequential trust expansion may happen as an automatic process executed as a background process that does not affect the operations of the security appliance.

The flow chart 900 illustrates the steps of a procedure for foreign entities to self-register to a security appliance. Clearly, the ability to allow third parties to self-register places the security appliance in a sensitive state. An administrator, or other cryptographic officer, controls whether the appliance enters or exits this state. By default, the appliance may enter this state during the initial set up mode. In step 902 public keys and/or other identifying information are entered into the appliance. The administrator then runs a system program that returns the public keys of all the SEPs in the appliance. Once the administrator is satisfied, the appliance is placed into a mode in which it does not accept additional white list entries unless an additional procedure (defined in flowchart 910) is performed.

The second flow chart 910 illustrates a quorum recovery authorization process of a new SEP joining the array. If a new SEP is to be added to an array, a quorum of recovery officers using recover cards introduces a new SEP to a first trusted member of the array in step 912. Once trusted, the new SEP receives the white list from the first trusted SEP (step 914), and the new SEP's public key is added to first trusted SEP's white list. Then the trust expansion of step 920 may then ensue.

In more detail the first trusted SEP may respond to a request to join, issued from the new SEP, by generating a nonce or ephemeral public/private key pair and a message encoded with the nonce that includes its public key. The nonce, which is illustratively a randomly generated number, is utilized to ensure freshness of the keys being transferred. That is, the nonce is utilized to ensure that the keys being exchanged are the most up to date keys and to prevent an attacker from using a replay attack on the system. A quorum of recovery officers appears at the new SEP to recover the nonce. The new SEP verifies the signature on the first trusted SEP public key with the nonce. The new SEP then signs its own public key with the nonce and sends it to the first trusted SEP. The first trusted SEP than sends its entire white list to form the white list of the new SEP. For more detail see U.S. patent application Ser. No. 11/540,441, entitled, "System and Method for Establishing a Shared Secret Among Nodes of a Security Appliance," filed Sep. 29, 2006, and owned commonly with the present application. This application is hereby incorporated herein by reference.

At the conclusion 910 of the quorum recovery authorization process, a new SEP has joined the array and has a white list including the public keys of all the trusted SEPs of the array. The third flow chart 920 proceeds to step 922 where the new SEP requests to join a second trusted SEP of the array. Rather than executing the recovery authorization process the second SEP broadcasts a message to all the trusted SEPs in the array asking if the new SEP is trusted in step 924. In step 926, the first trusted SEP responds and sends its white list, with the new SEP public key, to the second trusted SEP. The new SEP continues this expansion process in step 928 one by one with the SEPs in the array until all of the SEPs share the same white list that includes the new SEP's public key.

As mentioned above, white lists are held in EEPROMs so that the lists may be updated. The trust expansion ends if the EEPROMs are full, whereupon the SEPs listed in the EEPROMs are all trusted and the array operates on that basis. At that point no new SEPs may join the array.

Figure 6:
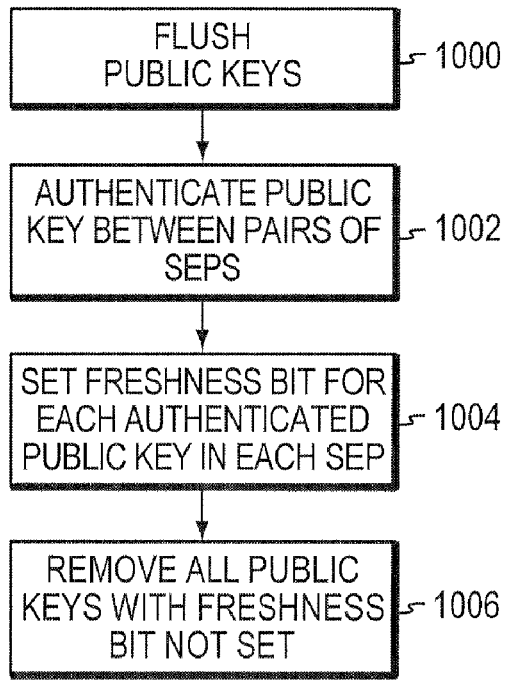
FIG. 6 is a flow chart of flushing white lists.

Periodically on a heartbeat or other routine trigger, a process for flushing contraction of public keys from white lists may be executed. FIG. 6 is a flow charts illustrating a process 1000 where an administrator discovers and discards, revokes, or flushes unused public keys from the white lists. In order to accomplish this, each SEP tracks each of its stored white list of public keys by associating each public key with a "freshness indicator," e.g. a bit.

Figure 5:
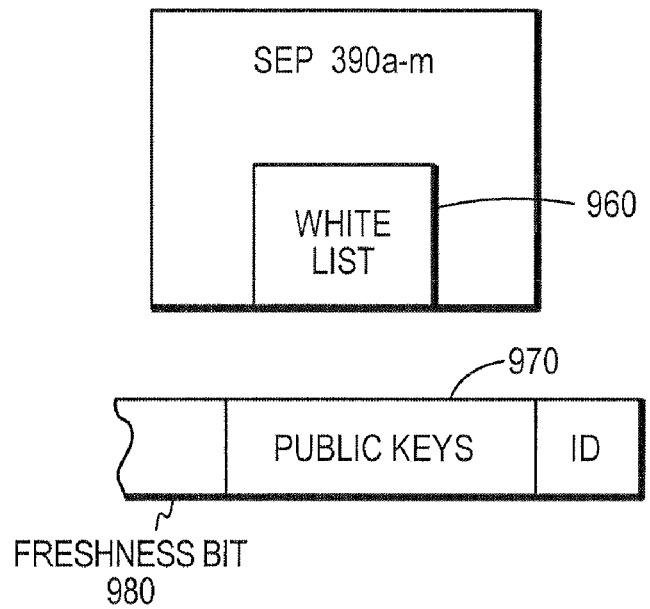
FIG. 5 is a schematic/format of a white list entry identifying the SEP, its public key and including a freshness bit.

FIG. 5 shows an exemplary white list 960 with an associated entry 970 that tracks the white list entries. A freshness bit 980, e.g., is set whenever the corresponding public key is authenticated. Referring back to FIG. 6, system software forces an authentication between all the SEP pairs 1002 in the array in steps 1002. The authentication may require the SEPs sending each other their white lists of trusted public keys. In step 1004, the freshness bit is set for each authenticated public key in each SEP. For any public key entry that is no longer present, the public key is not exchanged, and the freshness bit is not set. This old public key is deemed no longer viable. Tin step 1006, the system software instructs each SEP in the array to remove all the public keys whose freshness bit has not been set by the previous authentication.

Accordingly, this process revokes all SEP public keys not in the array. The trust expansion process of FIG. 4, then ensues making new trust links. The administrator may run this public key contraction whenever an SEP is removed from a array.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A method for forming a trust relationship between an array of mutually trusting systems and a new system, each comprising a processor and memory, the method comprising:
    introducing the new system to a first system of the array of mutually trusting systems, wherein the introduction includes the first system forming the trust relationship with the new system;
    transferring information to the first system of the array of mutually trusting systems from the new system, wherein the information identifies the new system;
    requesting a second system of the array of mutually trusting systems to form the trust relationship with the new system;
    in response to the request for the second system to form the trust relationship with the new system, the second system requesting if any other system of the array of mutually trusting systems already trusts the new system;
    in response to the second system requesting if any other system of the array of mutually trusting systems already trusts the new system, the first system responding and transferring the information to the second system of the array of mutually trusting systems; and
    establishing the trust relationship between the new system and each remaining system of the array of mutually trusting systems.

2. The method of claim 1 where establishing the trust relationship between the new system and each remaining system of the array of mutually trusting systems, further comprises:
    requesting each remaining system of the array of mutually trusting systems, that has not already established the trust relationship with the new system, to form the trust relationship with the new system wherein each remaining system asks whether any other system of the array of mutually trusting systems already trusts the new system, wherein one of the other systems responds by sending the information that includes the information identifying the new system, to each remaining system that asks, so that the identity of the new system becomes known to all systems in the array of mutually trusting systems.

3. The method of claim 1 wherein the trust relationship occurs in a background process with respect to other operating applications.

4. The method of claim 1 wherein the trust relationship includes having public keys of the array of mutually trusting systems within white lists stored in each of the new system, the first system, and the second system.

5. The method of claim 1 wherein transferring information comprises using a nonce to ensure freshness of the transferred information.

6. The method of claim 4 further comprising authenticating public keys in the white lists of the array of mutually trusting systems and flushing unauthenticated public keys from the white lists.

7. A method for forming a trust relationship between an array of mutually trusting systems and a new system, comprising a processor and a memory, that has already established a trust relationship with a first system of the array of mutually trusting systems, the method comprising:
    requesting, by the new system, that a second system of the array of mutually trusting systems accept the new system as a member of the array of mutually trusting systems;
    the second system requesting if any system of the array of mutually trusting systems has already established the trust relationship with the new system;
    sending, by the first system of the array of mutually trusting systems that trusts the new system, a white list including a new system public key identifying the new system to the second system, in response to the second system requesting if any system of the array of mutually trusting systems has already established the trust relationship with the new system;
    requesting, by the new system, to form the trust relationship with each remaining system of the array of mutually trusting systems;
    in response to the request to form the trust relationship with each remaining system, requesting, by each remaining system, if any system of the array of mutually trusting systems has already established the trust relationship with the new system; and in response to the request by each remaining system, transferring, by a particular system of the mutually trusting systems that has already established the trust relationship with the new system, the white list including the new system public key that identifies the new system, to each remaining system of the array of mutually trusting systems until the new system is trusted by all systems of the array of mutually trusting systems.

8. An apparatus for adding a new system to an array of trusted systems, each comprising a processor and a memory, the apparatus comprising:

a white list stored in each system of the array of trusted systems, the white list containing public keys identifying each trusted system in the array of trusted systems;

a trusted authority that enters a new public key of the new system into the white list of a first system of the array of trusted systems;

the new system to establish a trust relationship with each remaining system of the array of trusted systems, wherein each remaining system requests whether the new system has previously established the trust relationship with any system of the array of trusted systems; and in response to the request from each remaining system, transferring, by a particular system of the array of trusted systems that has already established the trust relationship with the new system, the white list that includes the new public key of the new system to each remaining system of the array of trusting systems.

9. The apparatus of claim 8 wherein the new system appends the white list containing the public keys identifying each trusted system in the array of trusted systems to a previous white list.

10. The apparatus of claim 8 further comprising:

a first message from the new system to a second system of the array of trusted systems requesting to form the trust relationship with the second system, a second message from the second system to other systems of the array of trusted systems asking if any of the other systems trusts the new system; and a third message from the first system including the white list that includes the new public key to the second system.

11. The apparatus of claim 8 wherein the new system and the array of trusted systems comprise secure storage systems.

12. The apparatus of claim 10 further comprising:

a fourth message from the new system to a third system in the array of trusted systems, wherein the message requests the third system to form the trust relationship with the new system, a fifth message from the third system to other systems of the array of trusted systems asking if any of the other systems trusts the new system, a sixth message from one of the systems of the array of trusted systems including the white list that includes a new public key of the new system to the third system.

13. The apparatus of claim 8 further comprising a nonce utilized to ensure freshness of the transferred public keys.

14. The apparatus of claim 8 further comprising a message sent to all systems of the array of trusted systems that commands all systems of the array of trusted systems to authenticate the public keys in the white lists and flush unauthenticated public keys.

15. An apparatus for forming a trust relationship between an array of mutually trusting systems and a new system, comprising a processor and a memory, that is trusted by a first system of the array of mutually trusting systems, the apparatus comprising:

a message from the new system requesting a second system of the array of mutually trusting systems to accept the new system as a trusted member of the array of mutually trusting systems;

a message from the second system asking if any system of the array of trusted systems already trusts the new system; and a message from the first system to the second system that includes the first system's white list that includes the new system's public key that was added to the white list when the first system formed the trust relationship with the new system.

16. The apparatus of claim 15 further comprising:

a first message from the new system to each remaining system of the array of mutually trusting systems requesting that each remaining system of the array of mutually trusting systems accept the new system as the trusted member the array;

a second message from each remaining system of the array of mutually trusting systems asking if any system of the array of mutually trusting systems already trusts the new system; and a third message from a particular system of the array of mutually trusting systems including the white list that includes the new system's public key to each remaining system of the array of mutually trusting systems.

17. An apparatus for forming a trust relationship between an array of mutually trusting systems and a new system, comprising a processor and a memory, the apparatus comprising:

means for introducing the new system to a first system of the array of mutually trusting systems, wherein the introduction includes the first system forming the trust relationship with the new system, means for transferring first information to the first system from the new system identifying the new system, means for transferring second information from the first system to the new system identifying all the systems in the array of mutually trusting systems;

means for establishing the trust relationship between the new system and each remaining system of the array of mutually trusting systems, wherein the means for establishing the trust relationship with the each remaining system comprises:

means for requesting, by each remaining system of the array of mutually trusting systems, whether any other system of the array of mutually trusting systems has already established the trust relationship with the new system, and means for sending, by a particular system of the array of mutually trusting systems that has already established the trust relationship with the new system, the second information to each remaining system of the array of mutually trusting systems.

18. The apparatus of claim 17 further comprising;

means for requesting a second system of the array to form the trust relationship with the new system, means for asking, by the second system, if any other system of the array of mutually trusting systems already trusts the new system, and means for sending, by the first system, an identity of the new system to the second system.

* * * * *